AMPLIFIER HAVING PUSH-PULL OUTPUT WITH CURRENT SHARING OPERATION

Filed Dec. 14, 1967

JOHN M.P. GATES
INVENTOR
BY
BUCKHORN, BLORE, KLARQUIST & SPARKMAN
ATTORNEYS

United States Patent Office 3,470,484
Patented Sept. 30, 1969

3,470,484

AMPLIFIER HAVING PUSH-PULL OUTPUT WITH CURRENT SHARING OPERATION

John M. P. Gates, Portland, Oreg., assignor to Tektronix, Inc., Beaverton, Oreg., a corporation of Oregon Filed Dec. 14, 1967, Ser. No. 690,468
Int. Cl. H03f 3/04
U.S. Cl. 330—14 10 Claims

ABSTRACT OF THE DISCLOSURE

An amplifier having a push-pull output is described in which D.C. supply current is diverted from one output stage to the other by a gate means controlled by a signal derived from the output signal of such one output stage. The amplifier is employed to transmit the ramp voltage horizontal deflection signals to the cathode ray tube of an oscilloscope, and provides low power consumption by decreasing the D.C. current supplied to one output stage while simultaneously increasing the D.C. current supplied to the other output stage so that the total current drawn from the power supply is smaller than it would be if such current sharing operation were not employed. As a result the present amplifier consumes a total D.C. supply current of about 0.55 milliamp while producing positive and negative ramp output voltages of 160 volts amplitude with a maximum slope of 25 volts per microsecond when driving a capacitive load of 15 picofarads.

Background of invention

The subject matter of the present invention relates generally to amplifiers having push-pull outputs, and in particular to such an amplifier provided with a gate means which causes a D.C. supply current sharing operation to enable low power consumption.

The present amplifier may be employed as the horizontal amplifier of a cathode ray oscilloscope with the push-pull outputs of such amplifier connected to the right and left horizontal deflection plates of a cathode ray tube in such oscilloscope to supply ramp shaped sweep voltages thereto. D.C. supply current derived from a constant current source is shared between the two output stages of the amplifier by distributing such current through a gate means controlled by a signal derived from the output signal of one of such output stages. When the input signal and control signal are ramp voltages the D.C. supply current flowing through one output stage decreases while the current flowing to the other output stage increases as the amplitude of the input signal increases. Thus, as a negative going ramp voltage output signal is applied to the left deflection plate, a positive going output signal is applied to the right deflection plate and due to current sharing the total D.C. supply current consumed by the amplifier remains substantially constant at a low value of approximately 0.55 milliampere when positive and negative push-pull ramp output voltages of 160 volts amplitude each are produced. Since the current sharing operation provides the amplifier of the present invention with a very low power consumption, it may be employed in a portable, battery operated oscilloscope to great advantage.

Previous horizontal amplifiers for cathode ray oscilloscopes not employing the current sharing technique of the present invention consumed a greater amount of power since they required a D.C. supply current of about twice that of the present circuit. In addition, conventional horizontal sweep amplifiers employed in battery operated oscilloscopes cannot provide deflection voltages with as great a slope or sweep rate as that of the present circuit when driving the capacitive load of the deflection plates.

It is therefor one object of the present invention to provide an improved amplifier having a push-pull output and which consumes a small amount of D.C. supply current.

Another object of the present invention is to provide an improved horizontal amplifier for a cathode ray oscilloscope to supply ramp shaped voltage push-pull output signals of high amplitude and sweep rate and with low power consumption in the amplifier.

A further object of the present invention is to provide an amplifier having a push-pull output in which a constant current source of D.C. supply current is employed to supply current to both output stages with a gate means for diverting current from one output stage to another in accordance with the amplitude of an input signal applied to such amplifier to provide a more efficient current sharing operation.

Brief description of drawings

Other objects and advantages of the present invention will be apparent from the following detailed description of a preferred embodiment thereof and from the attached drawings of which.

Description of preferred embodiment

Figures 1, 2:
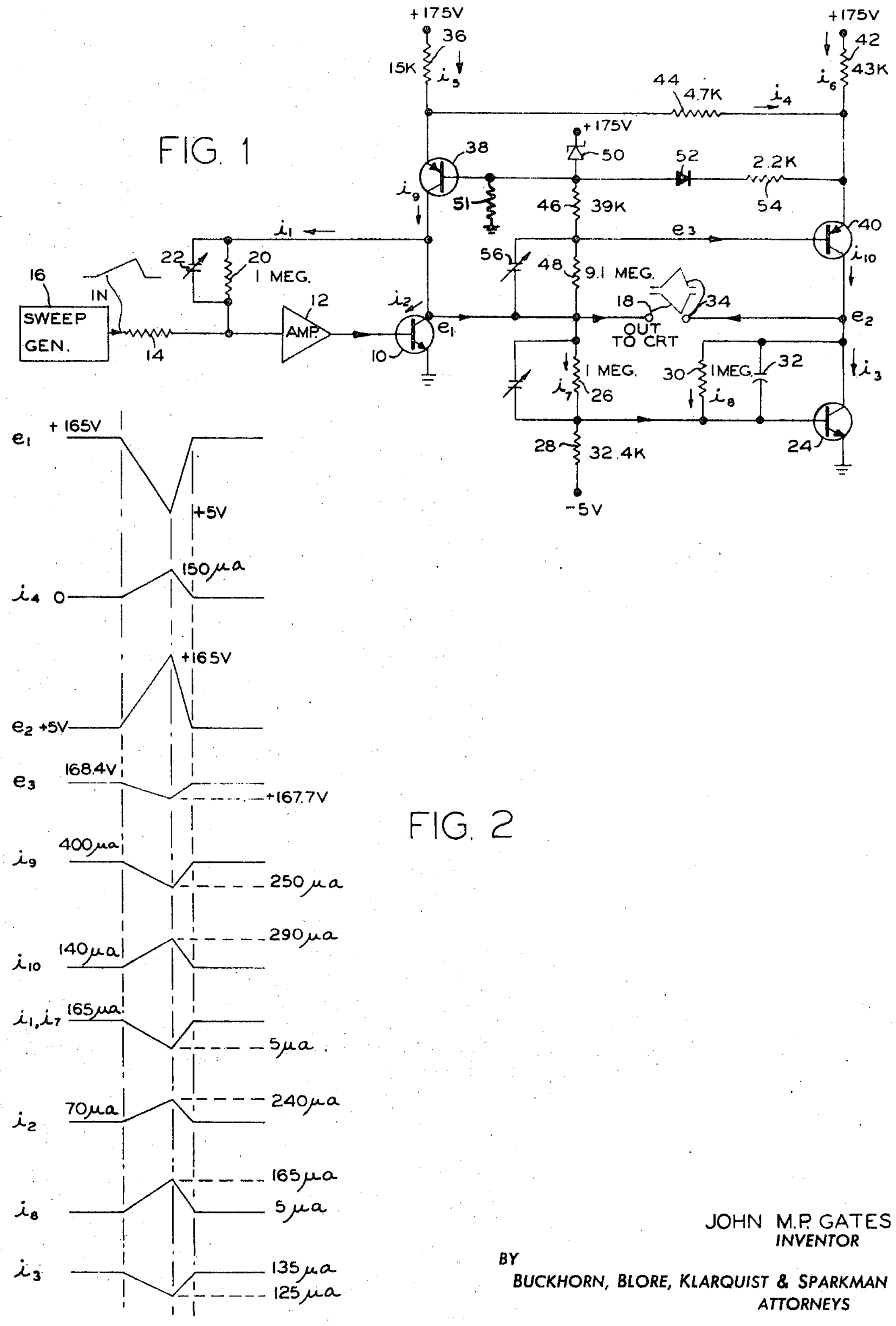
FIG. 1 is a schematic diagram of one embodiment of the amplifier circuit of the present invention.
FIG. 2 is a diagram of the waveforms of voltage and current signals produced by the amplifier of FIG. 1.

As shown in FIG. 1, the amplifier circuit of the present invention includes a first transistor 10 of the NPN type having its base connected through an input amplifier 12 and a coupling resistor 14 to the output of a sweep generator 16. Transistor 10 is connected as a grounded emitter amplifier with its collector connected to a first output terminal 18 to which may be connected the left horizontal deflection plate of the cathode ray tube of an oscilloscope. A feedback resistor 20 and a parallel shunt capacitor 22, which may be variable for frequency compensation purposes, are connected from the collector of transistor 10 to the input of amplifier 12 in order to form an operational amplifier circuit which serves as the first output stage of the push-pull amplifier of the present invention. It should be noted that amplifier 12 may be formed by two cascaded transistors connected as common emitter amplifiers which have not been shown for purposes of simplicity.

The second output stage of the amplifier circuit includes a second transistor 24 of the NPN type having its base connected to the junction between a pair of voltage divider resistors 26 and 28 which are connected in series between the output terminal 18 and a source of negative D.C. supply voltage of —5 volts. A feedback resistor 30 and parallel shunt capacitor 32 are connected between the collector and base of transistor 24 to form an operational amplifier therewith. Thus transistor 24 is connected as a grounded emitter amplifier with its collector connected to a second output terminal 34 to which the right horizontal deflection plate of the cathode ray tube may be connected.

A portion of the output signal produced on the collector of transistor 10 is transmitted as the input signal to the base of transistor 24 so that the amplifier circuit of the present invention produces push-pull output signals 180° out of phase with each other at output terminals 18 and 34. When the input signal of the amplifier circuit is a ramp shaped horizontal sweep signal, the push-pull output signals of the circuit are ramp voltage signals $e_1$ and $e_2$ shown in FIG. 2 to each have an amplitude of 160 volts with their leading edges having a maximum slope of 25 volts per microsecond capability when driving a capacitive load of 15 picofarads provided by the deflection plates.

The D.C. supply current transmitted to the first output stage including transistor 10 is supplied by a positive source of D.C. supply voltage of +175 volts through a load resistor 36 and a first gating transistor 38. The gating transistor 38 is of the PNP type having its collector connected to the collector of transistor 10 and its emitter connected to load resistor 36. A second gating transistor 40 of the PNP type is provided to control D.C. supply current transmittted to the second output stage including transistor 24. The gating transistor 40 has its collector connected to the collector of transistor 24 and its emitter connected to a second source of positive D.C. supply voltage of +175 volts through a load resistor 42.

To provide the above-mentioned current sharing operation a coupling resistor 44 is connected between the emitters of transistors 38 and 40 which enables a portion of the D.C. supply current flowing through load resistor 36 to be diverted away from gating transistor 38 and transmitted instead through gating transistor 40 to the second output stage including transistor 24, rather than to the first output stage including transistor 10. Thus the gating transistors 38 and 40 do not act as switches, but are quiescently biased conducting and remain conducting during the operation of amplifier circuit to transmit supply current to the amplifier transistors 10 and 24. The control signal for the gate means including transistors 38 and 40 is applied to the base of transistor 40. The base of the gating transistor 40 is connected between a pair of voltage divider resistors 46 and 48 which are connected in series between the output terminal 18 and a constant D.C. reference voltage of +168.4 volts produced at the anode of a Zener diode 50. The Zener diode 50 is connected to ground through a bias resistor 51 connected to the base of transistor 38 and provides this reference voltage across such bias resistor as a result of its voltage drop of about 6.6 volts from the source of positive D.C. reference voltage of +175 volts connected to its cathode. The base of the first gating transistor 38 is also connected to the +168.4 volts D.C. reference voltage at the anode of Zener diode 50. A control voltage signal $e_3$ proportional to the negative ramp output voltage signal $e_1$ produced on the collector of amplifying transistor 10, is applied to the base of gating transistor 40 due to the voltage divider formed by resistors 46 and 48. The control voltage $e_3$ produces a corresponding negative voltage signal on the emitter of transistor 40 which varies from a +169 volts quiescent value to a +168.3 volts peak value including the +0.6 volt drop across the emitter to base junction of such transistor. The voltage on the left terminal of coupling resistor 44 is held at +169 volts due to reference voltage of +168.4 volts on the base of transistor 38 and the +0.6 volt drop across the emitter junction of transistor 38. Since the voltage on the right terminal of coupling resistor 44 is less than that on its left terminal, a portion of the constant D.C. supply current of 400 microamperes transmitted through load resistor 36, is diverted away from the first gating transistor 38 and caused to flow through the coupling resistor 44 and the second gating transistor 40. This shared current $i_4$ is shown in FIG. 2 to increase from 0 to a value of 150 microamps corresponding to the peak of the ramp control voltage $e_3$. Thus the D.C. supply current $i_9$ transmitted through the first gating transistor 38 decreases from 400 microamps to 250 microamps and simultaneously the D.C. supply current $i_{10}$ transmitted through the second gating transistor 40 increases from 140 microamps to 290 microamps as a result of the shared current $i_4$, as shown in FIG. 2. The total D.C. supply current flowing through load resistor 36 remains constant at 400 microamperes. However, since there is a slight voltage variation on the emitter of transistor 40, the current $i_6$ flowing through load resistor 42 does increase slightly from a quiescent value of 140 microamperes to approximately 156 microamperes. Nevertheless the total D.C. supply current remains substantially constant at a value of 550 microamperes which represents the sum of such currents. Thus a total D.C. current of only 0.55 milliampere is employed to produce the push-pull output voltages $e_1$ and $e_2$ of 160 volts amplitude, which of course represents a very low power consumption.

Referring again to FIG. 2, the current $i_{10}$ flowing through the second gating transistor 40 is divided between the current $i_3$ flowing through amplifier transistor 24 and the current $i_8$ flowing through feedback resistor 30 which produces the deflection voltage $e_2$. In a similar manner the current $i_9$ flowing through gating transistor 38 is divided so that one current portion $i_2$ flows through the first amplifier transistor 10, another portion $i_1$ flows through feedback resistor 20 to form the deflection voltage $e_1$, and a third portion $i_7$ flows through resistor 26.

The values of the circuit components are given on the drawing and will not be repeated. For example, load resistor 36 has a value of 15 kilohms, while voltage divider resistor 48 has a value of 9.1 megohms. Of course the values of these circuit components, as well as the current and voltage values of the waveforms of FIG. 2 can be changed. The values given were chosen for a horizontal amplifier employed in a cathode ray oscilloscope.

It should be noted that as the deflection voltage $e_1$ supplied to the left deflection plate at output terminal 18 decreases to a more negative voltage, the total current $i_9$ supplied to the first output stage including transistor 10 and feedback resistor 20 decreases because it requires less current due to the lowering of voltage $e_1$. This decrease in D.C. supply current for the first output stage enables current $i_4$ to be supplied to the second output stage from the constant current source including resistor 36 without having a harmful effect. This additional current $i_4$ when added to the current $i_6$ produces a total current $i_{10}$ flowing through transistor 40, which increases to provide the positive going deflection voltage $e_2$ supplied to the right deflection plate at output terminal 34. As a result of this current sharing a balanced push-pull output signal is produced. It should be noted that the current signal $i_{10}$ is not precisely accurate, since it assumes that the current $i_6$ flowing through resistor 42 remains constant at 140 microamperes which is not true for the reason stated above. However, the slight change in this current does not affect the above description.

While it is not essential for higher frequency sweep speeds, additional current may be supplied to the gating transistor 40 through a diode 52 and a coupling resistor 54 connected in series between the anode of Zener diode 50 and the emitter of transistor 40. Diode 52 is normally biased nonconducting due to the fact that its anode is held at the reference voltage of +168.4 volts, while its cathode is normally more positive due to $e_3$. However, at higher frequencies a bypass capacitor 56 connected in parallel with voltage divider resistor 48 transmits more of the ramp signal voltage $e_1$ and increases the amplitude of the control voltage $e_3$ applied to the base of gating transistor 40, causing diode 52 to be rendered conducting. This transmits additional D.C. supply current through diode 52 and coupling resistor 54 to the gating transistor 40 in a somewhat similar manner to the way coupling resistor 44 does in the current sharing operation previously described. It should be noted that the high frequency operation of diode 52 causes more supply current to be consumed and may be eliminated in amplifiers of lower frequency.

It will be obvious to those having ordinary skill in the art that many changes may be made in the details of the above described preferred embodiment of the present invention. For example, vacuum tubes can be employed in place of the transistors even though this is somewhat undesirable because of their high current requirements.

I claim:

1. An amplifier circuit which produces a push-pull output signal using a current sharing operation to provide low power consumption, comprising:

a pair of amplifiers having their outputs connected to the two output terminals of said circuit;

input means for applying an input signal to said amplifiers and causing said amplifiers to transmit two output signals of opposite phase to said output terminals to form the push-pull output signal;

current supply means including a source of D.C. supply current connected to both of said amplifiers;

gate means connected between said source of current and said amplifiers, said gate means being quiescently biased conducting and remaining conducting during the operation of the amplifier circuit to transmit the supply current to said amplifiers; and control means for applying a control signal to said gate means corresponding to the one output signal produced by one amplifier to cause at least a portion of the supply current to be diverted by said gate means from said one amplifier to the other amplifier in an amount dependent upon the decrease in amplitude of said one output signal to enable a corresponding increase in amplitude of the other output signal produced by said other amplifier.

2. An amplifier circuit in accordance with claim 1 in which the pair of amplifiers includes a pair of first and second signal translating devices with the input of the first device connected to the input terminal of said circuit and the input of the second device connected to the output of said first device.

3. An amplifier circuit in accordance with claim 2 in which the gate means includes a pair of third and fourth signal translating devices with the third device connected between the source of current and the first device and with the fourth device connected in series with a coupling resistor and connected between the source of current and the second device, said third device having its control electrode connected to a source of substantially constant reference voltage and causing said source of current to supply a substantially constant current.

4. An amplifier circuit in accordance with claim 3 in which the control means includes a plurality of resistors connected in series to form a volume divider between the output of the first device and a control electrode of the fourth device in the gate means to apply the control signal to said control electrode.

5. An amplifier circuit in accordance with claim 1 in which the input means is a ramp voltage signal generator, and the control means causes the current to decrease in said one amplifier and increase in said other amplifier simultaneously in accordance with a ramp shaped control signal.

6. An amplifier circuit in accordance with claim 5 in which the ramp generator is the sweep generator of a cathode ray oscilloscope and the output terminals of the amplifier circuit are connected to the horizontal deflection plates of such oscilloscope.

7. An amplifier circuit in accordance with claim 3 in which the signal translating devices are transistors and the third transistor has a Zener diode connected to its base to provide the constant D.C. reference voltage which causes the constant current to flow through a load resistor connected to the emitter of said third transistor.

8. An amplifier circuit in accordance with claim 2 in which the signal translating devices are transistors and the pair of amplifier stages are both operational amplifiers having feedback resistors connected between the output and input of each amplifier.

9. An amplifier circuit in accordance with claim 3 in which the current supply means also includes another source of D.C. supply current connected to the common connection of the fourth device and the coupling resistor to provide additional current for the second amplifier.

10. An amplifier circuit in accordance with claim 9 in which the control means provides a ramp shaped control signal which causes the current through the coupling resistor to increase with increases in voltage of said control signal to cause balanced push-pull ramp voltage output signals to be produced while maintaining the total D.C. supply current of both current sources substantially constant.

References Cited

UNITED STATES PATENTS 3,337,767 8/1967 Munier de Montrichard et al. 315—26

ROY LAKE, Primary Examiner

J. B. MULLINS, Assistant Examiner

U.S. Cl. X.R.

315—26; 330—15, 22, 123